US007975743B2

(12) United States Patent
Sleiman et al.

(10) Patent No.: US 7,975,743 B2
(45) Date of Patent: Jul. 12, 2011

(54) LABELLER

(75) Inventors: Joseph Z. Sleiman, Leamington (CA); Michael R. Schram, Comber (CA); Douglas F. Lovegrove, Comber (CA)

(73) Assignee: Joe & Samia Management Inc., Leamington, Ontario (CA)

( * ) Notice: Subject to any disclaimer, the term of this patent is extended or adjusted under 35 U.S.C. 154(b) by 0 days.

(21) Appl. No.: 12/603,769

(22) Filed: Oct. 22, 2009

(65) Prior Publication Data

US 2010/0101731 A1 Apr. 29, 2010

Related U.S. Application Data

(60) Provisional application No. 61/108,179, filed on Oct. 24, 2008.

(51) Int. Cl.
*B32B 11/10* (2006.01)

(52) U.S. Cl. ........ 156/358; 156/361; 156/366; 156/367; 156/368; 242/364; 242/538.1; 242/345.1

(58) Field of Classification Search .................. 156/358, 156/361, 366, 367, 368, 387, 538, 541; 242/364, 242/538.1, 345.1
See application file for complete search history.

(56) References Cited

U.S. PATENT DOCUMENTS

| | | | | | |
|---|---|---|---|---|---|
| 4,015,292 | A | * | 3/1977 | Kirn | 360/130.23 |
| 4,488,925 | A | | 12/1984 | Craig et al. | |
| 5,628,468 | A | * | 5/1997 | Jung et al. | 242/345.1 |
| 6,199,614 | B1 | * | 3/2001 | Snyder et al. | 156/387 |
| 6,257,294 | B1 | * | 7/2001 | Weisbeck | 156/356 |
| 7,178,574 | B2 | | 2/2007 | Nielsen et al. | |
| 2002/0189741 | A1 | | 12/2002 | Nielsen et al. | |
| 2003/0221784 | A1 | | 12/2003 | Dods | |
| 2003/0221788 | A1 | | 12/2003 | Dods | |
| 2004/0089423 | A1 | * | 5/2004 | Nielsen | 156/542 |
| 2005/0219051 | A1 | * | 10/2005 | Nedblake | 340/572.1 |
| 2007/0209753 | A1 | * | 9/2007 | Gonzalez et al. | 156/212 |
| 2009/0272493 | A1 | * | 11/2009 | Sleiman et al. | 156/361 |

FOREIGN PATENT DOCUMENTS

| | | |
|---|---|---|
| EP | 1918210 | 5/2008 |
| JP | 2003261121 | 9/2003 |

OTHER PUBLICATIONS

International Search Report and Written Opinion dated Feb. 24, 2010.

* cited by examiner

*Primary Examiner* — George R Koch, III
(74) *Attorney, Agent, or Firm* — Warner Norcross & Judd LLP

(57) ABSTRACT

A labeler is supported on a frame and includes a waste liner rewind mechanism. The frame may be a two-piece frame, wherein each piece supports a plurality of labeler components. A waste liner rewind wheel is rotatably mounted on one of the frame members, and is capable of supporting the release liner of the label web after the labels have been removed and applied to items. A rewind drive is connected to the waste liner rewind wheel for advancing the waste liner rewind wheel to wind the release liner about the waste liner rewind drive wheel. The rewind mechanism actuates the rewind drive as a function of the amount of tension on the release liner. The labeler may also include a print mechanism positioned along the label web path for printing a desired printed information on the individual labels.

18 Claims, 12 Drawing Sheets

LABELLER

BACKGROUND OF THE INVENTION

The present invention is directed to a labeler for applying labels to products, and more particularly to a labeler for indexing labels from a label web and tamping the labels onto the products.

Labelers are well known for applying labels to items such as fruits, vegetables or other consumer goods. These devices typically include a label wheel that receives and holds a roll of label web, including a plurality of labels supported sequentially on a release liner. The label web is advanced from the wheel through the labeler to an edge, typically called a peel plate. The web is pulled over the edge of the peel plate to separate the labels from the support liner, allowing the labels to be deposited onto the items.

Many labelers include a tamping mechanism that can extend to deposit a label onto an item. For instance, it is common for labelers to include one or more tamping bellows, which include a tamping face in communication with a vacuum source and a positive pressure source, and are moveable between a retracted position and an extended tamping position. The tamping face of the bellows may be moved to a position adjacent to the peel plate to receive a label as the label web is indexed over the peel plate. The tamping bellows may then carry the label, using the vacuum source to hold the label on the tamping face, to a position in which the bellows communicates with a positive pressure source to extend the bellows and tamp the label onto an item to be labeled.

Although prior art labelers are generally acceptable, problems arise in a number of aspects of these labelers. For instance, difficulties arise with the release liner after the labels have been removed. The amount of this waste release liner continues to grow as additional labels are deposited onto items, creating a messy "tail" of release liner that can obstruct the user and the labeler until the user tears off or moves the tail—only to have the tail quickly grow back again.

Additional problems with prior art label webs include the replacement of label webs for labelling different types of products. In most cases, the labels on each label web are provided in a roll and are all preprinted with the same printed material for identifying a specific type of product. As a result, each time the labeler will be used to label a different type of product, the label web must be removed and replaced with another label web with the appropriate printed material for the new product to be labeled. In situations where many different types of items must be labeled and many label web changes need to be made, this type of labeler becomes inefficient.

Finally, it can be difficult to repair or replace labeler components when service or maintenance is need. The multiple labeler components are typically mounted on a frame, with each labeler component precisely interfitting with other labeler components. Service of one labeler component may require removal of other labeler components, or in some cases, may not be possible, resulting in the need to replace the entire labeler.

SUMMARY OF THE INVENTION

The present invention provides a labeler that is supported on a frame and includes a waste liner rewind mechanism for selectively advancing a waste liner rewind device, such as a wheel, as a function of the tension on the release liner.

In one embodiment, the frame supports a plurality of labeler components, including a tamping bellows connected to the frame, a label wheel rotatably mounted on the frame for supporting a label web including a release liner and a plurality of labels attached to said release liner, and a drive wheel mounted to the frame for advancing the label web from the label wheel to the tamping face. The waste liner rewind wheel is rotatably mounted on the frame, and is capable of supporting the release liner by winding the release liner about the waste liner rewind drive wheel. A rewind drive is connected to the waste liner rewind wheel for advancing the waste liner rewind wheel to wind the release liner about the waste liner rewind drive wheel. The rewind mechanism actuates the rewind drive as a function of the amount of tension on the release liner.

In another embodiment, the rewind drive mechanism includes a motion sensor for activating the rewind drive, a pivotable arm about which the release liner extends before it is wound about the waste liner rewind wheel, and a trigger arm adjacent to the pivotable arm. When the tension in the release liner decreases, the pivotable arm moves the trigger arm such that the trigger arm actuates the motion sensor to drive the rewind drive and thus rotate the waste liner rewind wheel to take up the slack in the release liner.

In another embodiment, the labeler includes a two-piece frame including a cassette frame member and a head frame member. The frame members can be separated from each other for repair or replacement. In one embodiment, the cassette frame member supports the label wheel, the rewind wheel, and the peel plate, and the head frame member supports the tamping bellows and the drive motor.

The labeler may include a print mechanism positioned along the label web path for printing a desired printed information on the individual labels. The print registration may be set by a tractor wheel adjacent to the printer, and a rotary encoder adjacent to the printer. In one embodiment, the print mechanism includes a camera scanner to verify the accuracy of the printed information.

The rewind mechanism, two-piece frame and print mechanism provide a low maintenance, highly efficient labeler that, when necessary, can be easily serviced.

DETAILED DESCRIPTION OF THE CURRENT EMBODIMENTS

I. Overview

Figure 3:
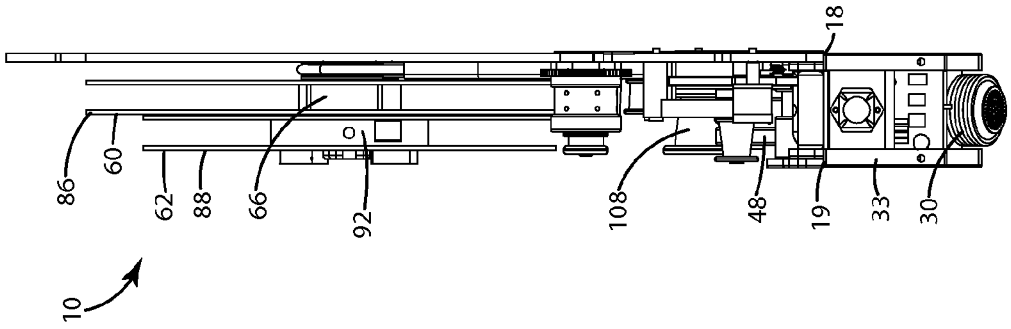
FIG. 3 is a right side view of the labeler.
Figure 2:
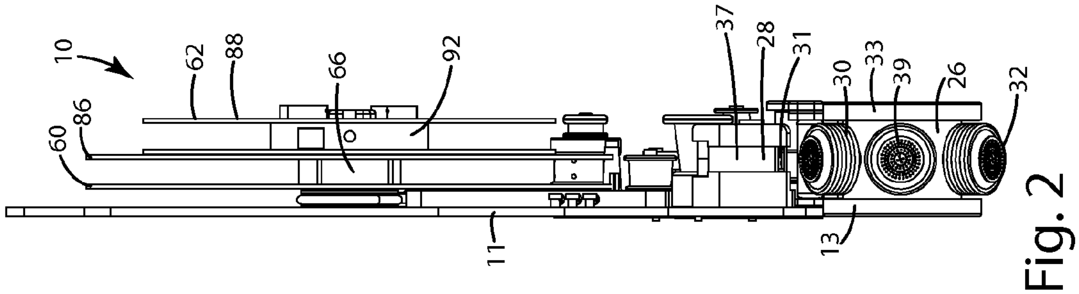
FIG. 2 is left side view of the labeler.
Figure 1:
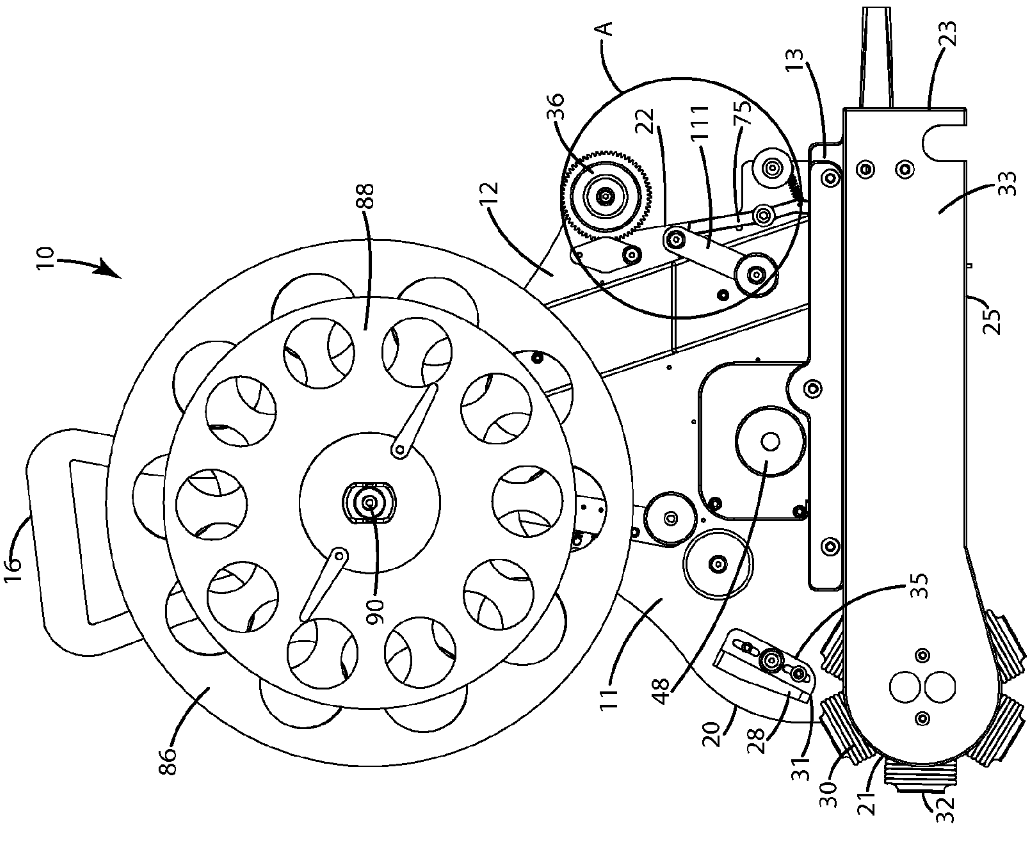
FIG. 1 is a front view of a labeler according to one embodiment of the present invention.
Figure 4:
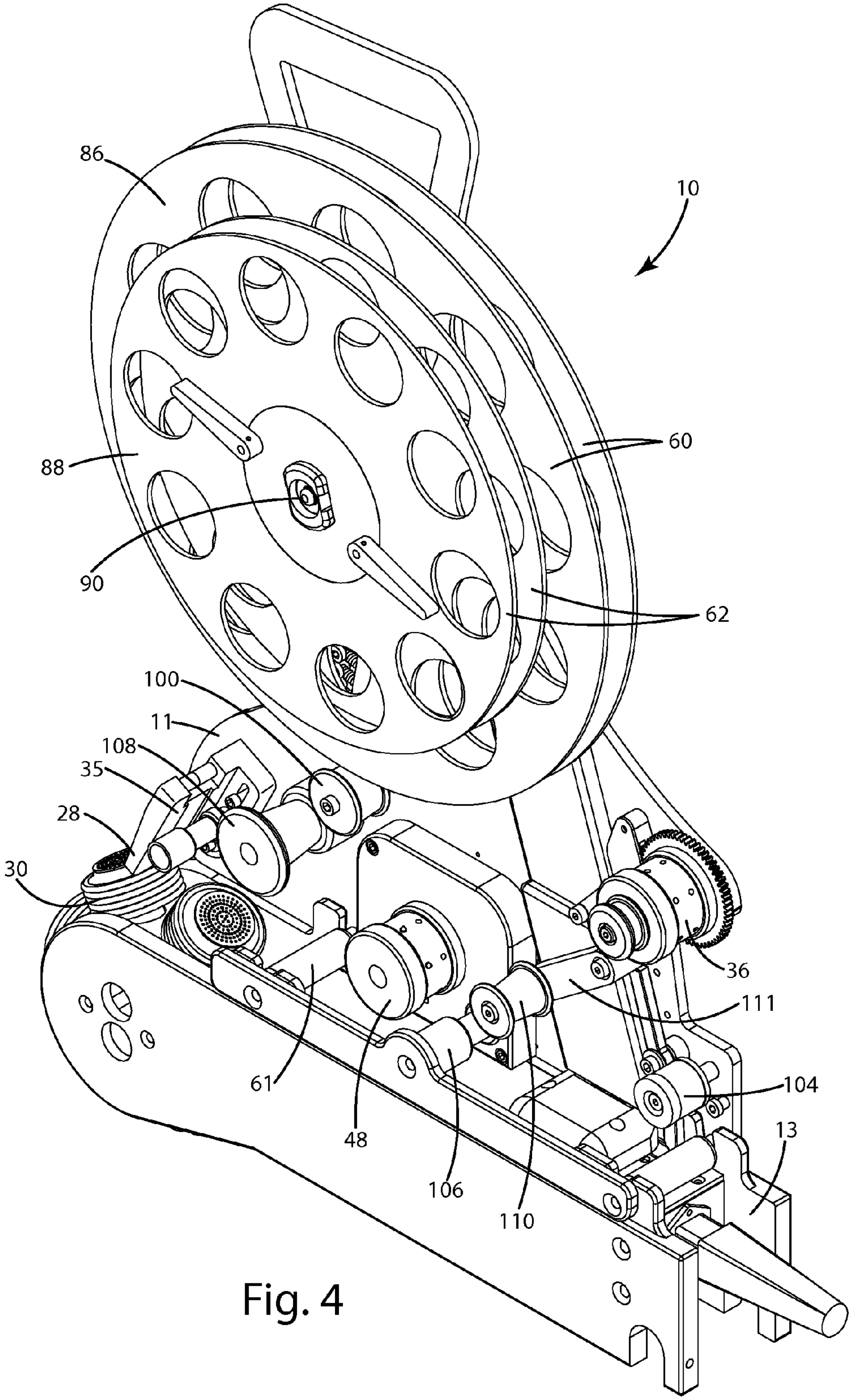
FIG. 4 is perspective view of the labeler.

A labeler according to one embodiment of the present invention is shown in FIG. 1 and generally designated 10. The labeler 10 includes a frame 12 that is generally a two-piece assembly including a cassette frame member 11 and a head frame member 13. In one embodiment, the head frame 13 pivots about a portion of the cassette frame 11 for easy separation of the frame portions. The labeler may additionally include a print mechanism for printing information on the individual labels carried on a label web, and a mechanism for rewinding the waste liner of the label web after the labels have been removed.

II. Structure

The frame 12 may be configured to contain or support a variety of the labeler head and cassette components, such as the labeler components described in detail in U.S. Pat. Nos. 6,729,375; 7,153,378; 7,158,574; and 7,363,954. The labeler components may be directly or indirectly attached to the frame. The frame 12 can be formed in any suitable size and shape and formed from a wide variety of materials, such as molded plastic or metal.

In one embodiment, the cassette frame member 11 and the head frame member 13 may each support a plurality of labeler components, including a label wheel 86, a peel plate 28, a first tractor wheel (or "drive wheel") 36, a second tractor wheel (or "drive wheel") 48, one or more tamping bellows 30, and a waste liner rewind wheel 88. The label wheel 86 and rewind wheel 88 are mounted on a rotatable shaft 90 extending from the frame 12 and is capable of supporting a conventional label web 51 in roll form. The label web 51 includes a release liner carrying a plurality of individual labels. Although the label wheel 88 and rewind wheel 86 are referred to as "wheels," it should be appreciated that they may be any such devices that are capable of taking up the labels and the release liner, for example, by winding the labels or the release liner about the device.

As noted above, the two-piece frame 12 is generally formed from a cassette frame member 11 and a head frame member 13. As discussed in more detail below, the cassette 11 and head 13 frame members may be separated to enable removal and replacement of either frame member. In one embodiment, the cassette frame 11 supports the labeler components generally associated with the routing of the label web 51, including the label wheel 86, the rewind wheel 88, and rollers for routing the label web 51 from the label wheel 86 to the peel plate 28 and for routing the release liner of the label web 51 from the peel plate 28 to the rewind wheel 88. The head frame 13 supports the labeler components generally associated with driving the label web 51 and tamping the labels, including a drive motor 44, a turret 26 supporting multiple bellows 30, and gears or other mechanisms for connecting the drive motor 44 to the turret 26 and to one or more drive wheels 36, 48.

As shown, the cassette frame member 11 includes a top edge 14 forming a handle 16, a bottom edge 18, a left side 20 and a right side 22. The head frame member 13 includes a top edge 19 engaging the bottom edge 18 of the cassette frame 11, a left side 21, a right side 23 and a bottom edge 25. The corner formed between the bottom edge 25 and left side 21 may include a rounded extension to support a turret 26 and bellows 30 as discussed below. A housing or cover 33 can be mounted to the front face of the head frame member 13 to at least partially enclose the components of the head 13. The frame 12 may also incorporate all required controls to become a "stand-alone" tamping bellows labeler, as also discussed below. The frame 12 may also incorporate other designs or parts that form a tamping bellows labeler.

Figure 9:
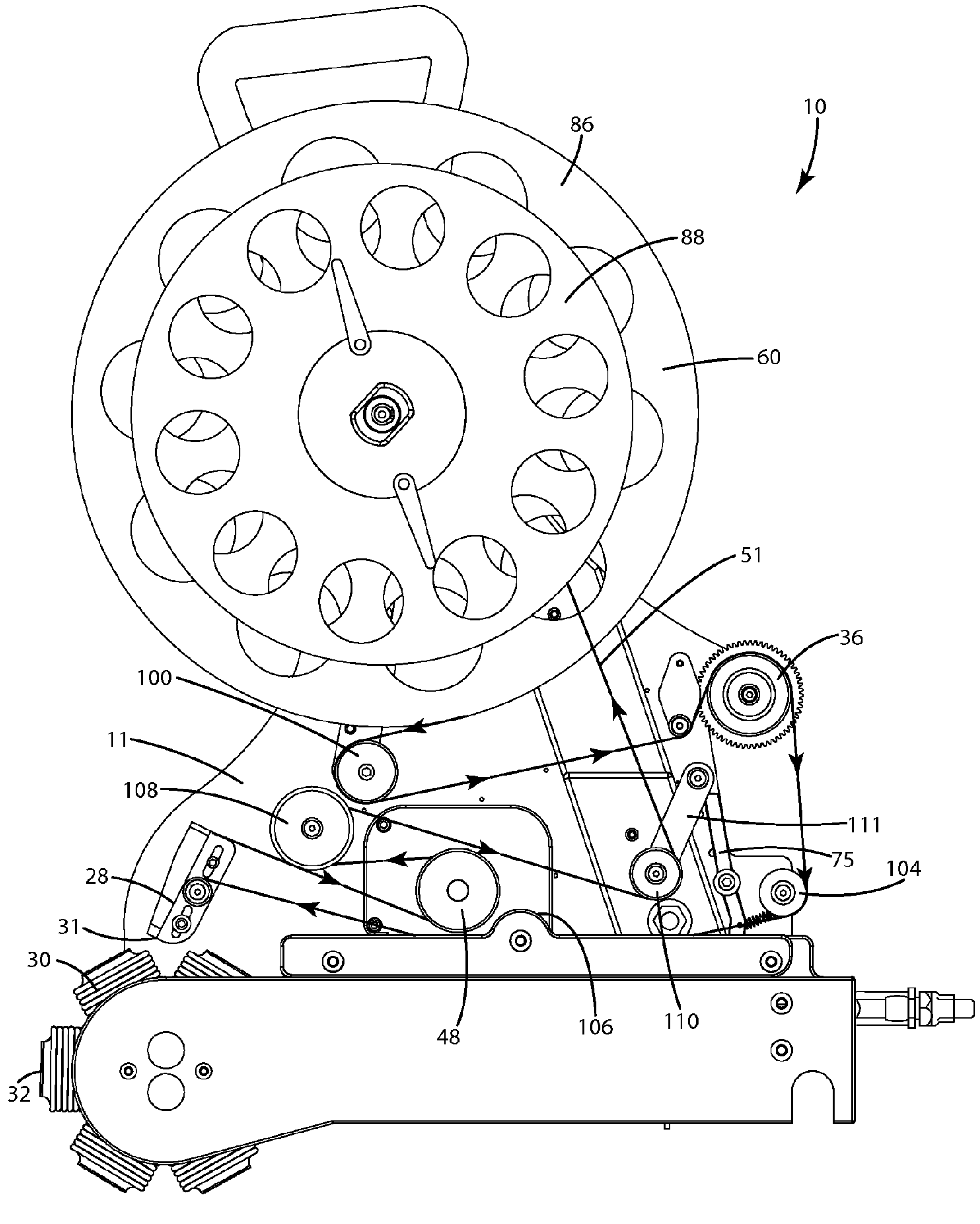
FIG. 9 is a front view of the labeler showing the label web path.
Figure 12:
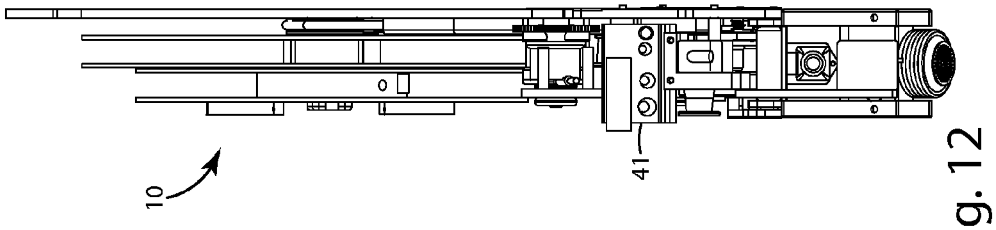
FIG. 12 is a right side view of the labeler with the print system engaged.
Figure 11:
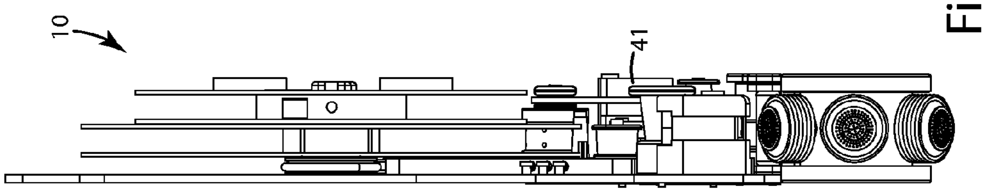
FIG. 11 is a left side view of the labeler with a print system engaged.
Figure 10:
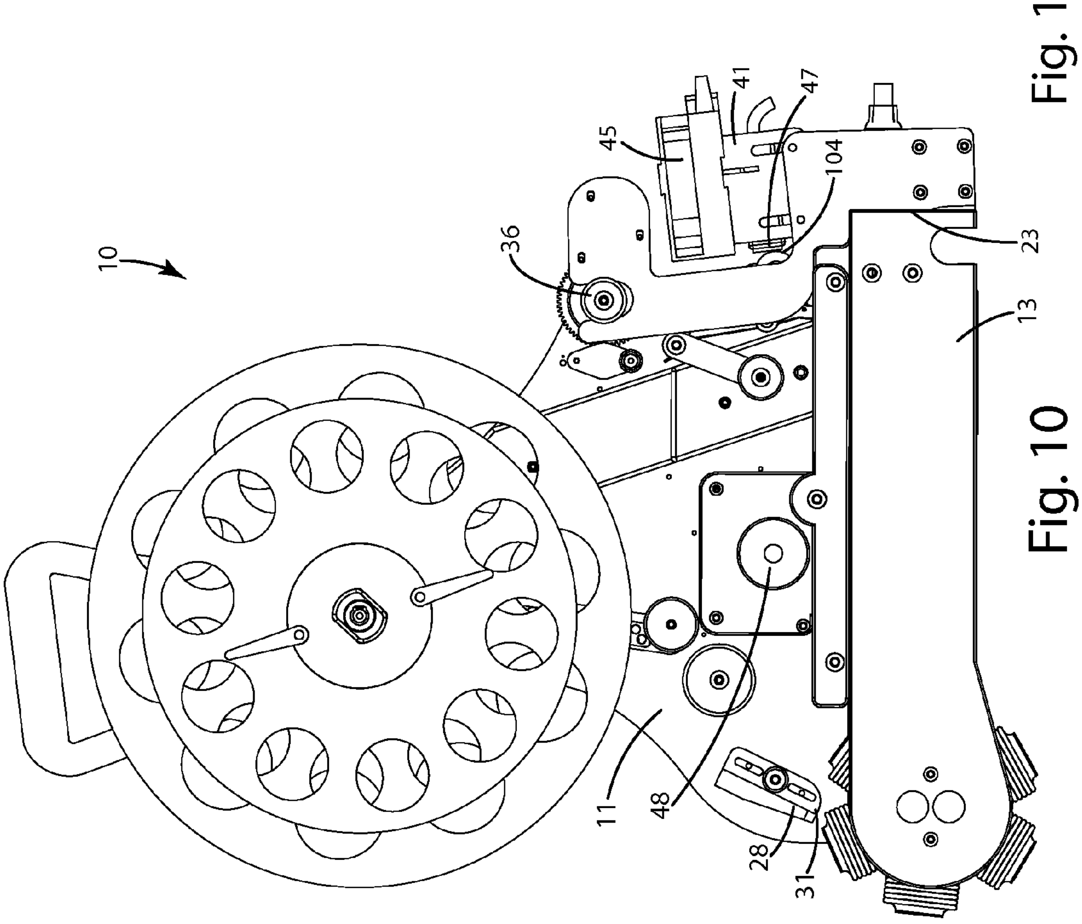
FIG. 10 is a front view of the labeler according to one embodiment of the invention wherein a print system is engaged.
Figure 13:
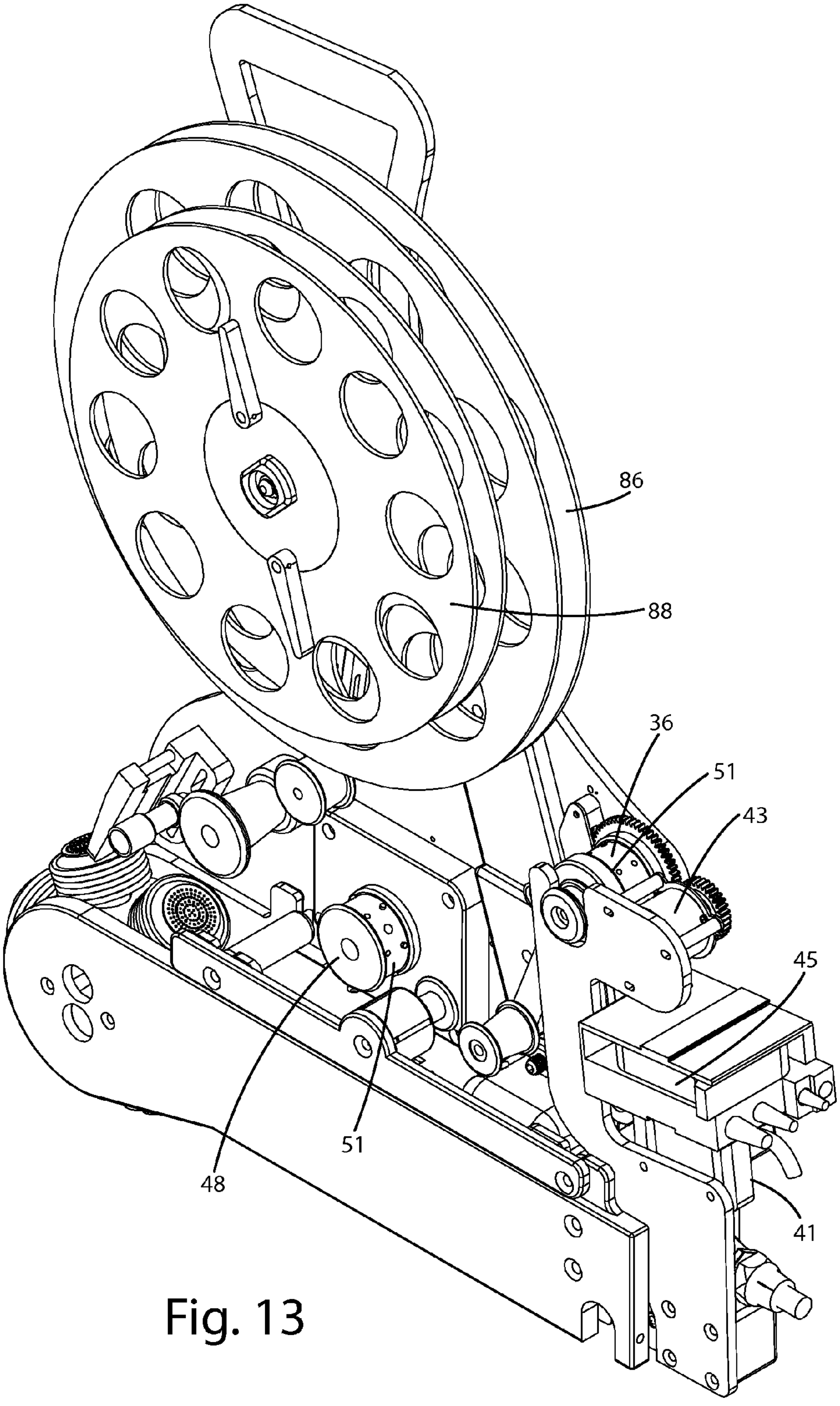
FIG. 13 is a perspective view of the labeler with a print system engaged.

FIG. 9 is a front view of the labeler 10 showing one embodiment of a path for the label web 51 with arrows to indicate how the label web 51 is wound around the label components. Initially the cassette 11 is provided with a full label roll wound around the label wheel 86, which includes a pair of discs 60 and a hub 66. In one embodiment, the label web 51 is pulled from the label wheel 86 by the synchronized, selective advancement of a pair of tractor wheels 36, 48 due to the engagement of the label web 51 with the tractor wheels 36, 48 (where holes or other structure in the web 51 contact protrusions or other structure on the tractor wheels 36, 48). As the label web is pulled from the label wheel 86, it extends around a first roller 100, and then around the first tractor wheel 36. The label web 51 is then routed around rollers 104 and 106, and then to the peel plate 28, where the labels are removed from the web 51 to be applied to products. The remaining waste liner is then wound around the second tractor wheel 48, a roller 108, and a roller 110 mounted on a pivotable arm 111 discussed below. The waste liner is then taken up on the waste liner roll 88, which includes a pair of discs 62 and a hub 92, by advancement of the rewind drive mechanism discussed below. The label web 51 may be pre-loaded through the rollers and tractor wheels 36, 48 when the cassette 11 is attached to the head 13, or it may be wound after attachment to the head 13. Although the illustrated embodiment includes two tractor wheels, the labeler 10 may alternatively include only a single tractor wheel to drive the label web 51. For instance, the tractor wheel 36 could be replaced with a roller.

The peel plate 28 is mounted to the cassette frame 13 adjacent to the tamping bellows 30 and includes a terminal end 31, around which the label web 51 can be drawn to separate the labels from the release liner of the label web. In one embodiment, the tractor wheels 36, 48 are capable of advancing the label web from the label wheel 86 and around the terminal end 31 of the peel plate 28. The tamping bellows 30 includes a tamping face 32 that is movable between a retracted position and an extended tamping position in which the tamping face can engage the labels as they are separated from the label web 51. The rewind wheel 88 is rotatably mounted on the shaft 90 and is capable of supporting the release liner by winding the release liner about the rewind wheel 88. In one embodiment, the rewind wheel rotates about the shaft 90 independently of the label wheel 86.

The peel plate 28 can be formed in any suitable shape and size and can include an upper surface 37 and a lower surface 35. In the illustrated embodiment, the terminal end 31 of the peel plate 28 is of a sufficient width such that the individual labels are peeled from the support wheel when they pass across the lower surface 35 and turn about the terminal end 31. In the illustrated embodiment, the peel plate 28 is positioned on the cassette frame 11 adjacent the bellows 30, such that as the individual labels are peeled from the wheel, they can each be placed on the tamping face 32 of a bellows 30. In one embodiment, the peel plate 28 may move in and out or up and down or sideways to release labels from the liner to be picked up by the bellows.

Each bellows 30 is adapted to extend to tamp a label from the tamping face 32 of the bellows onto an object, such as an item of produce. The exterior of each bellows 30 can be formed from a flexible material, such as rubber or silicone. In the illustrated embodiment, the bellows 30 has a series of accordion-like folds, such that the bellows 30 is capable of extending outwardly to place the labels on the products and then retracting to the previous position. The tamping face 32 of each bellows 30 is perforated with holes 39. In one embodiment, the label is held on the tamping face 32 via vacuum pressure communicated through the vacuum holes 39. The label can be deposited on the item by switching off a conventional vacuum source (not shown) in communication with the vacuum holes 39 when the bellows 30 is in an extended position. The bellows 30 may be extended into the extended position by a positive pressure source (not shown) in communication with the bellows 30. In one embodiment, both the vacuum and pressure supplies can be provided by an electric and/or pneumatic valve (not shown), which may be mounted to the frame 12 or any other suitable means for providing a vacuum source or a positive pressure source can be used. In one embodiment, the flexible bellows may be made from a clear (i.e. transparent or translucent) material, such that the internal components of the bellows 30 are visible through the flexible bellows material. The internal components, such as a check valve (not shown) may be made from a colored material that is visible through the flexible bellows material. In this way, an operator can visibly inspect whether or not the internal components are included in the bellows and positioned correctly.

Figure 5:
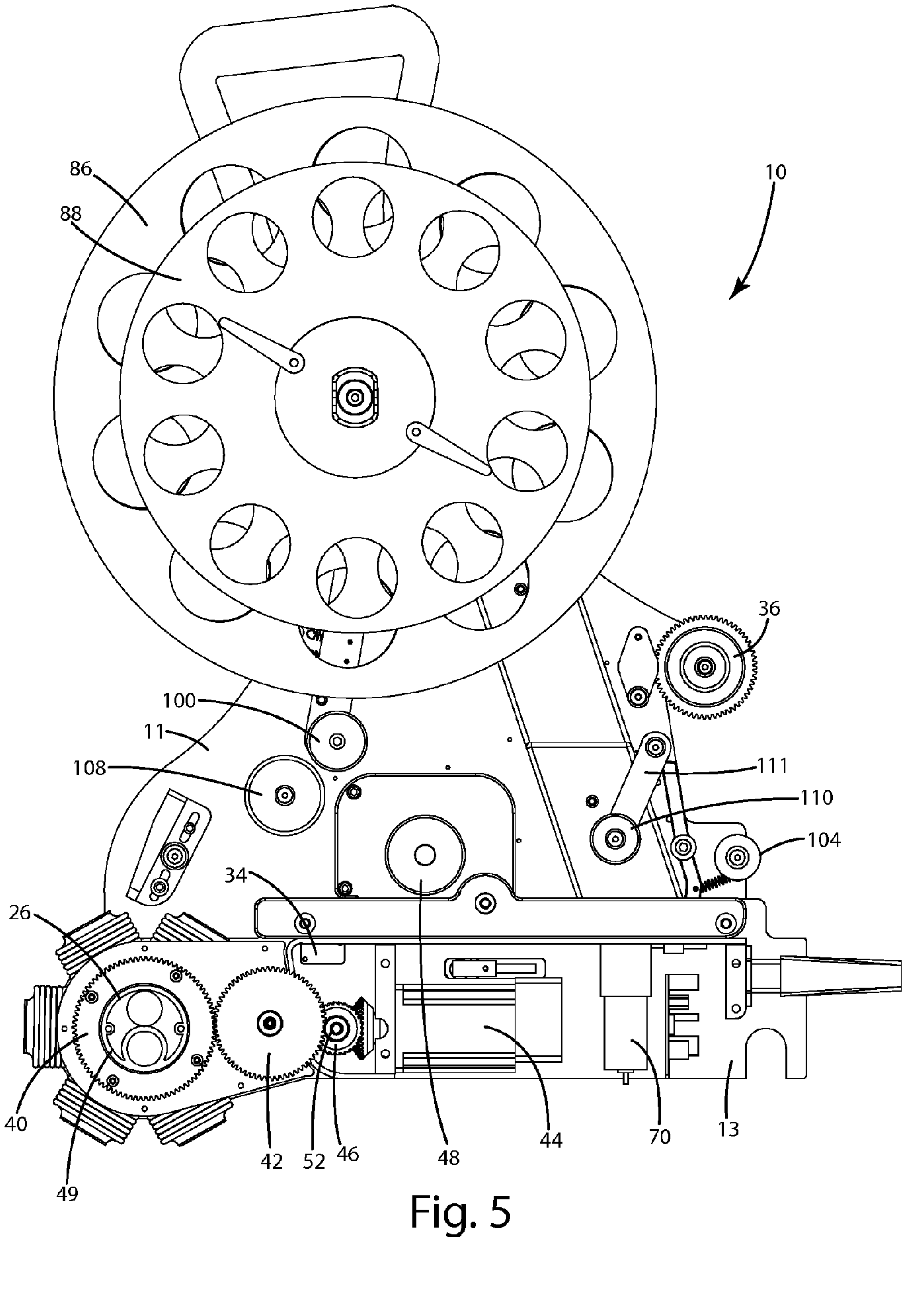
FIG. 5 is a front view of the labeler with the housing of the head frame removed.

Although many different bellows designs may be used, including single bellows designs and stationary bellows designs, in the illustrated embodiment, multiple bellows 30 are mounted to a rotating turret 26. As shown, the rotating turret 26 is positioned on the head frame 13 such that the turret 26 is located below the peel plate 28 when the cassette frame 11 and head frame 13 are connected to each other. As shown in FIG. 5, the turret 26 is mounted to the head frame 13 on a rotatable axle 49. In the illustrated embodiment, the axle 49 supports a gear 40, which is rotatably connected to the head frame 13.

Referring now to FIG. 5, the gear 40 may be driven by a variety of means to rotate the turret 26. In the illustrated embodiment, the gear 40 engages an intermediate gear 42 on the head frame 13 that is interconnected to a drive motor 44 mounted on the head frame 13 via a series of mitre gears 46 also mounted on the head frame 13. The motor 44 may be a DC electric motor, AC electric motor, stepper motor, servo motor, pneumatic or hydraulic motor, electric or pneumatic or hydraulic linear or rotary cylinder. The motor 44 may start and stop intermittently or operate continuously. In another embodiment, the gear 40 is driven by a belt that also drives other labeler components. In yet another embodiment, the gear 40 is driven by a dedicated belt drive, or another type of drive.

Figure 6:
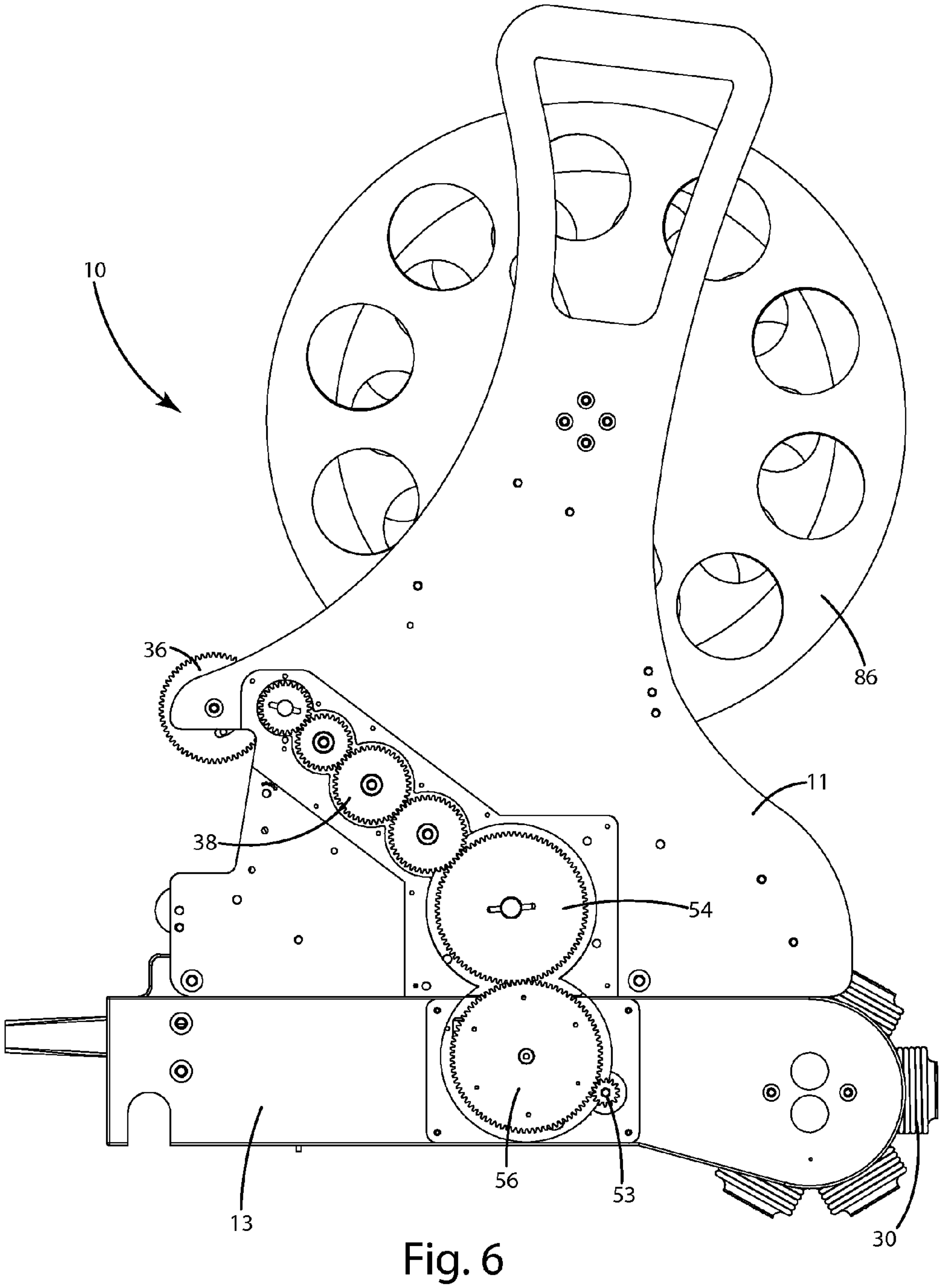
FIG. 6 is a rear view of the labeler.

The motor 44 may also be used to drive the label web 51 to advance the label web 51 from the label wheel 86 to the peel plate 28 and to drive the release liner of the label web 51 from the peel plate 28 to the waste liner rewind wheel 88. In one embodiment, the motor 44 is operatively connected to the tractor wheels 36, 48 on the cassette frame 11 to drive the tractor wheels 36, 48, and thus the label web 51. More particularly, as shown in FIGS. 5 and 6, the head frame 13 may include a head gear 56 connected to the drive motor 44 that rotates upon actuation of the motor 44. The head gear 56 may be connected to the motor 44 via a gear 53 mounted on an axle 52 that extends through the head frame member 13 and is interconnected to the motor 44 via the mitre gears 46. The head gear 56 engages a cassette gear 54 on the cassette frame 11 when the frames 11 and 13 are connected. The cassette gear 54 is mounted on an axle that extends through the cassette frame member 11 and supports the second tractor wheel 48 on the opposite side of the cassette frame member 11. The first tractor wheel 36 is linked to the second tractor wheel 48 via a series of gears 38 that drive the tractor wheels 36, 48 at the same rate, or at another desired rate. In another embodiment, the label web 51 and the turret 26 may be driven by multiple drives that are synchronised to move and/or rotate the various components in time with each other and/or at different speeds and/or different intervals during the label dispense and application cycle. The labeler speed can be controlled by an external sensor (photo-optic, inductive, capacitive, ultrasonic, laser or mechanical switch) that may detect the product and/or support mechanisms, calculates the product speed and adjusts the labeler speed. The labeler cycle activation can be controlled by internal and/or external software and/or electrical/electronic and/or hardware signal to start and/or stop intermittently or continuously.

The label position on the bellows 30 may be determined by a combination of one or more sensors to detect the position of the labels on the label web 51 and/or the position of the waste liner of the label web 51 after the labels have been removed. For example, the label position on the bellows 30 may be determined by a label sensor 34 on the head frame 13. In another embodiment, the label position on the bellows 30 may also be determined by a sensor (not shown) positioned on the cassette frame that detects the position of the waste liner drive roller pins. The sensors may be a combination of one or more photo optic, laser, inductive, capacitive, or other electrical/electronic sensors. The label position on the bellows 30 may otherwise be determined by a toothed belt or gears that mechanically synchronize the label and bellow positions.

Figure 7:
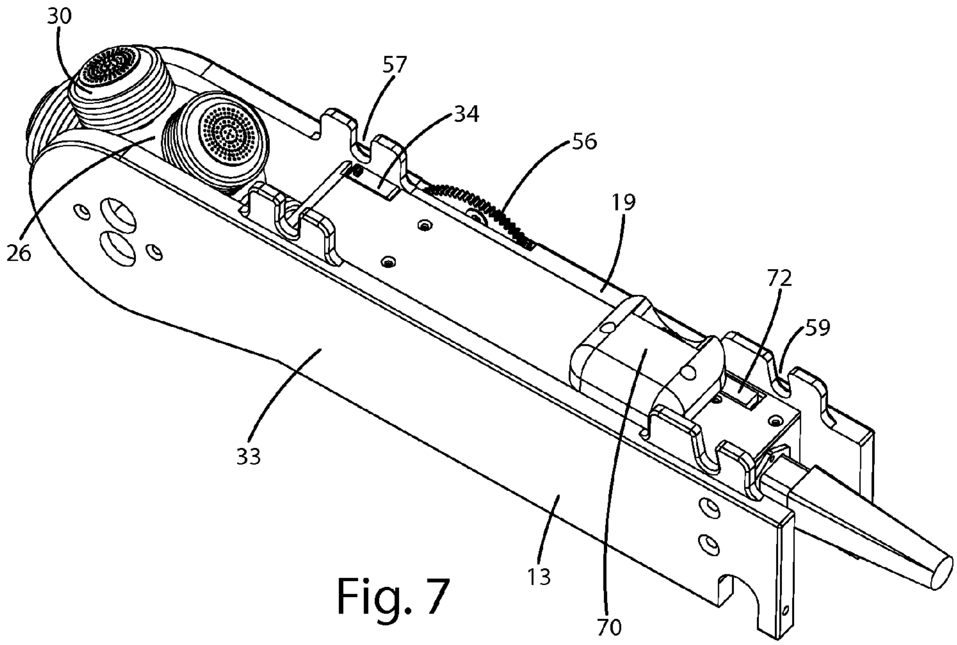
FIG. 7 is perspective view of the head.
Figure 8:
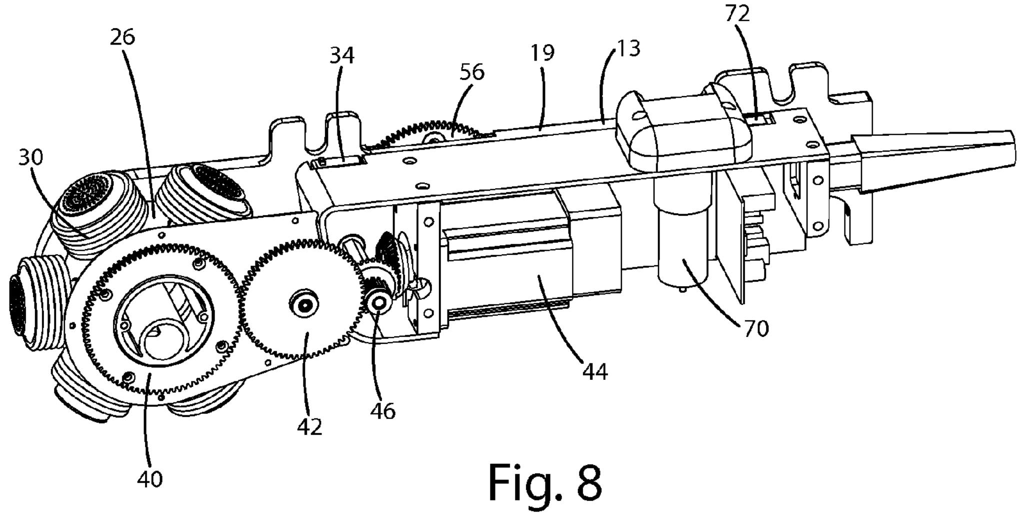
FIG. 8 is a perspective view of the head with the cover removed.
Figure 14:
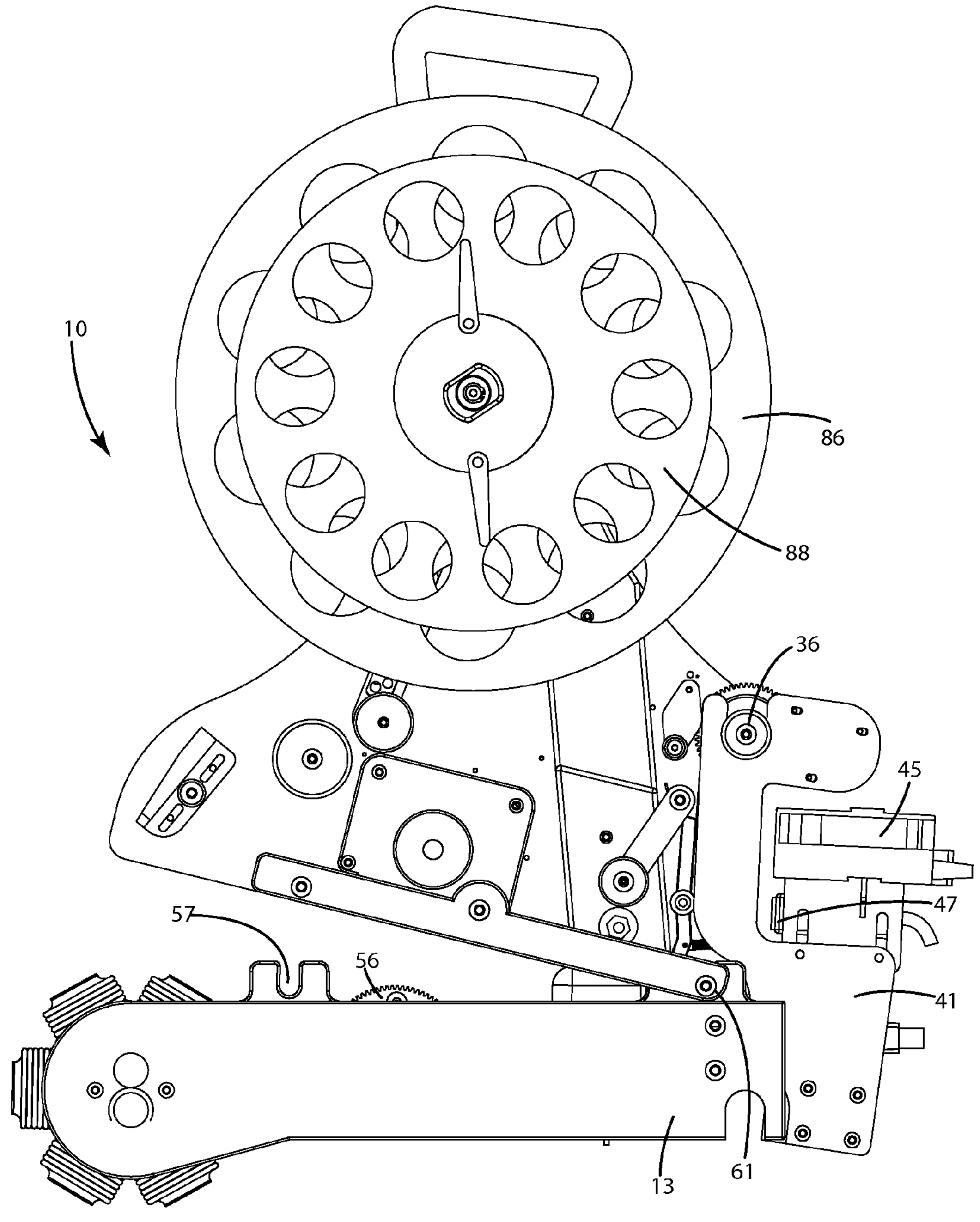
FIG. 14 is a front view of the labeler with a print system engaged and with the head partially removed from the cassette.
Figure 15:
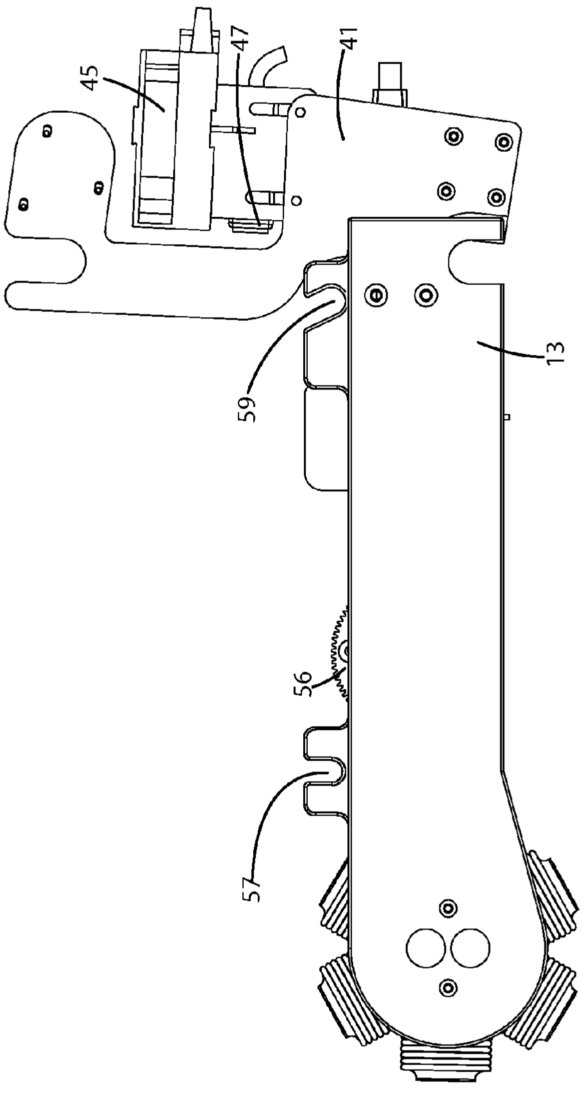
FIG. 15 is a front view of the head with the print system attached.

As noted above, the cassette frame 11 and head frame 13 may be separated and rejoined, enabling replacement of either component. In the illustrated embodiment, show in FIGS. 7 and 14, the head 11 includes a first slot 57 between tabs that extend generally perpendicular to the top edge 19 of the cassette 11, and a second slot 59 between tabs that extend at an angle from the top edge 19 of the head near the right side 23 of the cassette 11. A pair of pins 61 extend outwardly from the front face of the cassette frame member 11. The pins 61 align with the slots 57 and 59. In the illustrated embodiment, the cassette 11 is attached to the head 13 by sliding the rear pin 61 into the angled slot 59, and then forcing the front pin 61 into the perpendicular slot 57. The cassette 11 is removed by lifting the front of the cassette 11 until the front protrusion 61 clears the front slot 57 and then sliding the cassette forward to release the rear protrusion 61 from the angled slot 59.

Figure 18:
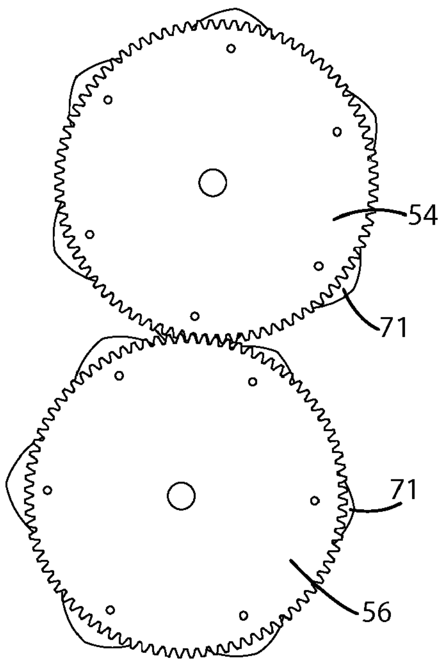
FIG. 18 is a front view of the flower petal gears.
Figure 19:
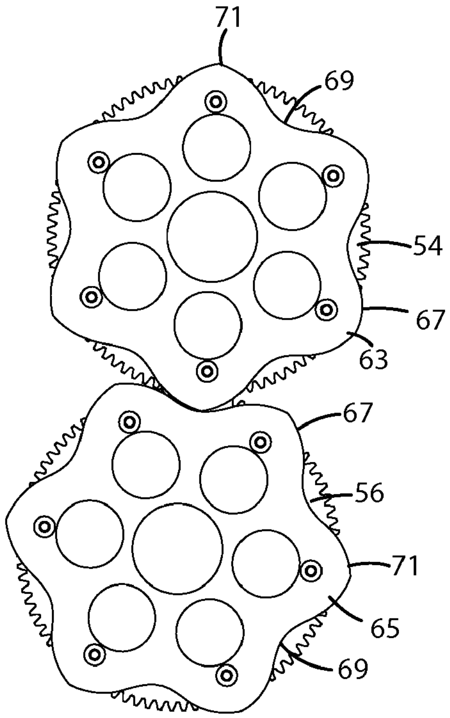
FIG. 19 is a rear view of the flower petal gears.

The cassette 11 and head 13 may be configured to properly align the turret 26 when the cassette 11 is attached to the head. In one embodiment, the cassette 11 and head 13 include flower petal type discs 63, 65 (shown in FIGS. 18 and 19) attached to or formed as part of the cassette gear 54 and head gear 56 respectively. The flower petal discs 63, 65 may be mounted on the axles of the head gear and cassette gear such that they rotate directly with the respective gears. The flower petal discs each include an undulating outer edge 67, with multiple recesses 69 and lobes 71. The number of recesses 69 may correspond to the number of bellows 30 on the rotating turret 26. In this embodiment, when the cassette 11 is attached to the head 13, the flower petal discs 63, 65 necessarily must rotate to interfit with each other. This ensures alignment of the turret 26, and bellows 30, in one of six positions. The flower petals are shown with a smooth, curved transition between the lobes 71 and recesses 69 to facilitate smooth engagement of the two flower petal discs 63, 65; however, the flower petal discs may have a wide variety of alternative shapes that provide alignment. In another embodiment, the head gear 56 and cassette gear 54 are manually aligned by the operator when the head 13 is attached to the cassette 13.

In one embodiment, shown in FIGS. 10-15, the labeler 10 includes a printing mechanism 41 adapted to print a desired printed material on the labels before they are placed onto objects. The printing mechanism 41 can be mounted on the frame 12 at one or more label positions prior to the peel plate dispensing edge 31 to print real-time, variable, or the same product information and/or identification. For instance, in the illustrated embodiment, the print mechanism 41 is mounted to the cassette frame 11 along the label path such that it is spaced from the peel plate 28, to enable printing on labels that are a few labels away from the peel plate. Alternatively, the print mechanism 41 may positioned on the label path adjacent to the peel plate 28, to enable printing on the label that will next be picked up by a tamping bellows 30. The print mechanism may be one of a variety of print technologies, including ink-jet, direct thermal, thermal transfer, laser, ultra-violet or special light reactive. In one embodiment, the printing mechanism 41 may be moveable along the label path in one or more directions, for instance, to enable printing the printed information on the label while the label is not in motion.

In the embodiment illustrated, the label web 51 is routed from the label wheel 86 around the first tractor wheel 36, which (as noted above) includes protrusions to properly position the label web 51 on the tractor wheel 36. This prevents the label web 51 from moving and/or stretching with respect to the rollers and the tractor wheels, and controls the position of the printed image (known as "print registration") on the label web 51. An electronic positioning device, such as a rotary encoder 43, may be attached to the tractor wheel 36 or the print mechanism to precisely control the angle of rotation of the idler roller in order to properly register a label for printing. As illustrated, the print mechanism 41 and encoder are mounted to the right edge 23 of the head frame 13. The print mechanism 41 is mounted such that it extends upwardly from the side of the head 13 to prevent interference with the components of the cassette 11 and head 13 during the attachment of the cassette 11 to the head 13. The print mechanism 41 rotates into place when the head frame 13 and cassette frame 13 are connected, such that the printer 45 can receive the label web 51. As shown, the printer 45 is positioned adjacent the label web 51 path between the first tractor wheel 36 and the roller 104. In an alternative embodiment, the print mechanism 41 and encoder 43 can be attached to a different portion of the head 13 or to the cassette 11, or, in another embodiment, a print mechanism may be mounted separate from the cassette 11 and head 13 on a support structure (not shown) in a position to move into contact with the label web. In another embodiment, the print mechanism 42 includes a print verification device 47, such as a camera scanner, positioned along the label web path after the printer 45. The print verification device 47 is capable of imaging the printed material on the labels and verifying whether the material meets certain parameters, such as darkness or position.

In one embodiment, the print mechanism 41 is electrically coupled to the system controller (not shown) and a user input interface (not shown). The controller may be programmed to allow a user to input a desired print type and control the print mechanism 41 to output labels with that print type. The print mechanism 41 and/or controller may incorporate software or hardware speed and/or position sensing device to signal and control the printer to print the information while matching the label dispensing speed to maintain accurate print location on the labels. In one embodiment, an encoder 43 may be electrically connected to the controller to control the print mechanism and/or signal the software to improve the print registration and/or print image quality (i.e. contrast, darkness, dpi resolution). The print verification device 47 may be electrically coupled to the controller to signal the controller when the printed material falls outside a predetermined parameter set.

In the illustrated embodiment, the label wheel 86 and rewind wheel 88 are formed as a multi-disc assembly that supports both the pre-loaded label roll and waste liner. The label web or roll can be supported on the label wheel 86 between the discs 60 and wound around the label wheel hub 66. The waste liner portion of the label web 51, which remains on the labeler 10 after the labels have been removed and applied to products, may be wound onto the rewind wheel 88 around the hub 92 between the discs 62. The label wheel 86 and waste liner rewind wheel 88 may be rotatably mounted on the same shaft 90, such that they rotate independently about the shaft 90.

During operation of the labeler 10, the diameter of the label web on the label wheel 86 decreases, and the diameter of the waste liner on the waste liner rewind wheel 88 increases as the rewind hub 92 accumulates waste liner. Thus, the rotation speed of the label wheel 86 must vary with respect to the rotation speed of the rewind wheel to avoid unwanted tension or unwanted slack on the label web 51. In one embodiment, the present invention includes a rewind mechanism, including a rewind drive motor 70, to drive the rewind wheel separate from the label wheel 86. In one embodiment, the rewind drive motor 70 is mounted to the head 13 for driving the rewind wheel 88 in order to take up the waste label liner after a label or series of labels has been applied. As shown in FIGS. 5, 7, 8, 16 and 17, the rewind drive motor 70 is connected to the rewind drive wheel 86 by a belt 80 extending around a pulley attached to mitre gear 74 and also around a pulley (not shown) on the rewind wheel 88. The mitre gear 74 is connected to the drive 70, however, other linking mechanisms may be used. In the illustrated embodiment, the rewind drive motor 70 is activated by a motion sensor 72 at the top edge 19 of the head 13, such that the rewind drive motor 70 operates to turn the rewind wheel 88 when the motion sensor 72 is triggered.

Figure 16:
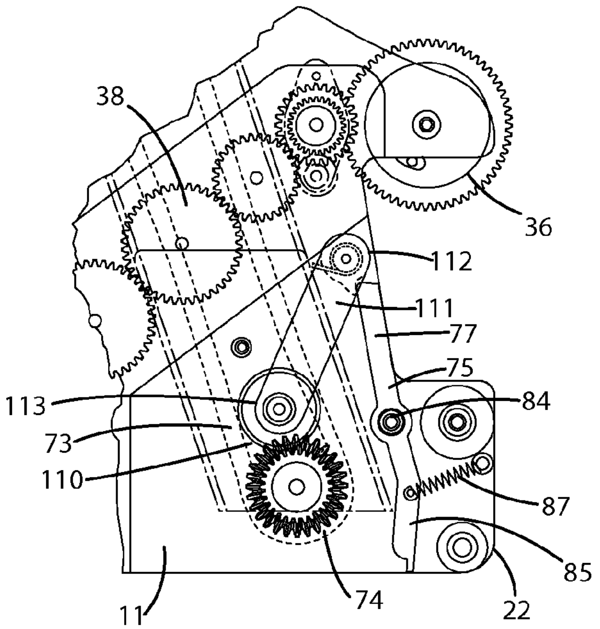
FIG. 16 is a close up view of the rewind mechanism in a first position taken approximately from the portion "A" circled in FIG. 1. For purposes of illustration, hidden objects are shown in dotted lines.
Figure 17:
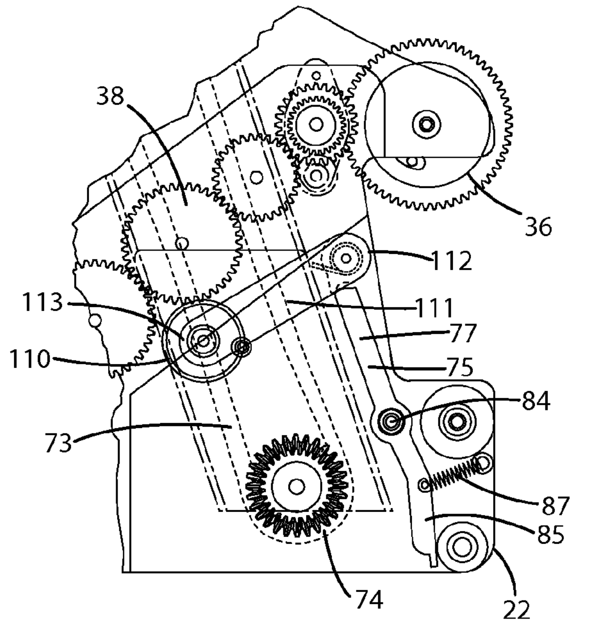
FIG. 17 is a close up view of the rewind mechanism in a second position take approximately from the portion "A" circled in FIG. 1. For purposes of illustration, hidden objects are shown in dotted lines.

The motion sensor can be triggered by a trigger arm 75 that is mounted to the cassette frame 11. Referring to FIGS. 16 and 17, the trigger arm is connected to the cassette frame by a pin 84, such that the arm 75 can rotate about the pin 84. As shown, the arm includes a first portion 77 that extends upwardly from the pin 84 and a second portion 85 that extends downwardly from the pin 84 toward the motion sensor 72 on the head 13. The second portion 85 of the arm and the motion sensor 72 are positioned relative to each other such that the motion sensor 72 is actuated when the second portion 85 of the arm moves to the left (away from the right edge 22 of the cassette frame 11). The second portion 85 is biased to the right (toward the right edge of the cassette frame 11) by a spring 87. A pivotable arm 111 is positioned on the cassette frame 11 proximate to the first portion 77 of the trigger arm 75. The pivotable arm 75 includes a first end 112 rotatably mounted to the cassette frame 11 and a second end 113 that supports the roller 110. The pivotable arm 75 may be biased toward the right edge 22 of the cassette frame 11 by a spring (not shown), but in operation it is typically pulled to the left into a first position (FIG. 17) by the tension of the release liner wrapped around the roller 110. When the pivotable arm 111 is moved to the right into a second position (FIG. 17), it engages the first portion 77 of the trigger arm 75 and pushes it to the right, thus pushing the second portion 85 of the trigger arm to the left to activate the rewind drive 70. If the tension in the release liner of the label web 51 decreases (i.e. slack increases), the pivotable arm 111 drops to the second position, engaging the trigger arm 75 and moving the trigger arm 75 to activate the rewind drive 70 and rotate the waste liner rewind wheel 88.

In an alternative embodiment of the rewind mechanism, the belt 80 may have a relatively smooth outer surface, and in one embodiment is made from a relatively slippery material, such as urethane, such that the belt generally slips with respect to one or both of the pulleys. When the label wheel 86 is rotated by the advancement of the label web to apply a label, the increased friction between the belt 80 and the pulley on the rewind wheel causes the belt 80 to drive the rewind wheel 88 and thus take up any slack in the waste label liner onto the rewind wheel hub. This rewind mechanism may be used in place of the trigger arm mechanism described above, or it may be used in combination with the trigger arm mechanism, for instance, as a safety device in the event that the trigger mechanism fails. The illustrated waste liner rewind mechanisms may be retrofitted onto existing labelers by replacing the gears or other rewind mechanism of the labeler with the trigger arm or pulleys and belt described above.

III. Operation

In operation, the labeler 10 may begin by actuating the drive motor 44 to begin indexing the label web 51. The motor 44 may be electrically connected to the controller and a under input interface, such that the motor 44 is actuated by the controller after a particular input by the user. When the motor is actuated, the tractor wheel 36, 48 rotate at least an amount to index one label past the peel plate 28 and onto the tamping face 32 of a bellows 30. In one embodiment, one or both of the tractor wheels 36, 48 may include a series of protrusions 50 around their circumference that interfit with holes in the release liner to aid in pulling the label web 51 from the label wheel and around the various idler pulleys and other components to the peel plate 28. The rotation of the tractor wheels 36, 48 pulls the label web 51 off the label wheel 86 and around the peel plate 28, and pulls the waste release liner onto the rewind wheel 88. In another embodiment, the rotation of the tractor wheels 48 alone may be sufficient to advance the label web 51. In yet another embodiment, the tractor wheels 36, 48 may be connected to other labeler components, such as the label wheel 86 and rewind wheel 88 to aid in driving the label web 51.

As the label web 51 is advanced around the peel plate 28, the labels are separated from the release liner portion of the label web 51. The release liner portion of the web 51 is then pulled around the second tractor wheel 48. The release liner is pulled around the pulley 110 supported on the pivotable arm 111, and wound onto the rewind wheel 88. As noted above, as the release liner 51 extends around the pulley 110, the tension in the web 51 pulls the pulley 110 and the arm 75 to the left. As the labeler 10 continues to operate, and slack develops in the release liner, the pulley 110 and arm 75 drop to the right and into engagement with the trigger arm 75, rotating the second portion 85 of the trigger arm to the left to activate the motion sensor 72 and thus drive the waste liner rewind wheel 88 to take up the slack in the waste liner. The movement of the pivotable are 111 and actuation of the rewind drive 70 will occur repeatedly, and "on-demand" to maintain tension in the waste liner.

In an embodiment including a print mechanism 41, as the label web 51 is indexed, the print mechanism 51 may print a desired printed material onto each individual label. The print registration is controlled by the first tractor wheel 36 and the encoder 43, which may interact with the controller and a user input interface to print the correct printed material at the correct location and with the correct contrast and resolution. If included, the print verification device may be controlled to verify that the printed image is within acceptable parameters, and to send a signal to the controller to signal the user if the printed image is outside such parameters.

The above description is that of the current embodiment of the invention. Various alterations and changes can be made without departing from the spirit and broader aspects of the invention as defined in the appended claims, which are to be interpreted in accordance with the principles of patent law including the doctrine of equivalents. Any reference to claim elements in the singular, for example, using the articles "a," "an," "the" or "said," is not to be construed as limiting the element to the singular.

The embodiments of the invention in which an exclusive property of privilege is claimed are defined as follows:

1. A labeler comprising:

a frame for supporting a plurality of labeler components;

a tamping bellows connected to said frame, said bellows including a tamping face that is moveable between a retracted position and an extended tamping position;

a label wheel rotatably mounted on said frame, said label wheel capable of supporting a label web, said label web including a release liner and a plurality of labels attached to said release liner;

a drive wheel mounted to said frame, said drive wheel capable of advancing said label web from said label wheel to said tamping face;

a waste liner rewind device rotatably mounted on said frame, said waste liner rewind device capable of supporting said release liner by winding said release liner about said waste liner rewind device;

a rewind drive connected to said waste liner rewind device for advancing said waste liner rewind device to wind said release liner about said waste liner rewind device; and a rewind mechanism that actuates said rewind drive as a function of the amount of tension on said release liner, said rewind mechanism including a pivotable arm, a trigger arm and a motion sensor, said pivotable arm mounted to said frame at a first pivot point, said pivotable arm including a portion about which said release liner extends, said trigger arm mounted to said frame at a second pivot point spaced from said first pivot point, wherein movement of said pivotable arm about said first pivot point moves said trigger arm about said second pivot point, said motion sensor capable of sensing movement of said trigger arm and actuating said rewind drive.

2. The labeler of claim 1 wherein said pivotable arm moves said trigger arm when the tension on said release liner decreases.

3. The labeler of claim 2 wherein said trigger arm includes a first portion extending in a first direction from said second pivot point and a second portion extending in a second direction from said second pivot point, said second portion capable of rotating about said second pivot point to actuate said motion sensor.

4. The labeler of claim 3 wherein said label wheel and said waste liner rewind device are rotatably mounted about a common shaft.

5. The labeler of claim 4 including a peel plate, said label wheel capable of advancing said label web about a terminal end of said peel plate to separate said labels from said release liner, said rewind mechanism positioned between said peel plate and said waste liner rewind device.

6. The labeler of claim 1 including at least one roller mounted to said frame, said roller capable of directing said label web along a label path from said label wheel to said peel plate, wherein said labeler includes a print mechanism mounted to said frame, said print mechanism positioned adjacent to said label path such that said print mechanism is capable of printing on said labels as they pass from said label wheel to said peel plate.

7. The labeler of claim 6 wherein said labeler includes a rotary encoder mounted to said frame, said rotary encoder positioned between said label wheel and said print mechanism, such that said label web can be routed around said rotary encoder, said rotary encoder programmed to register said label web and said labels at a desired position with respect to said print mechanism.

8. The labeler of claim 7 wherein said labeler includes a controller in communication with said encoder, said print mechanism and said label position sensor, said controller programmed to adjust at least one of the rotary position of said encoder and a characteristic of said print mechanism as a function of a label position signal received from said label position sensor.

9. The labeler of claim 1 wherein said frame includes a cassette frame member and a head frame member separable from said cassette frame member, said label wheel and said waste liner rewind device mounted on said cassette frame member, said tamping bellows mounted on said head frame member.

10. The labeler of claim 9 including a drive motor connected to said drive wheel and capable of selectively advancing said drive wheel, said drive motor mounted on said head frame member.

11. The labeler of claim 10 including a rotatable turret mounted to said head frame member, said turret rotatable about a turret shaft extending from said frame, said turret supporting a plurality of said tamping bellows.

12. A labeler comprising:

a head frame member;

a cassette frame member selectively removable from said head frame member;

a tamping bellows mounted on said head frame member, said bellows including a tamping face that is moveable between a retracted position and an extended tamping position;

a drive motor mounted on said head frame member;

a label wheel rotatably mounted on said cassette frame member, said label wheel capable of supporting a label web and capable of being removed from said cassette frame member for replacement of said label web;

a waste liner rewind device mounted to said cassette frame member on a common shaft with said label wheel; and a rewind drive motor mounted on said head frame member;

wherein said drive motor is operatively connected to said label wheel for selectively advancing said label wheel when said head frame member is connected to said cassette frame member, and wherein said rewind drive motor is operatively connected to said waste liner rewind device for selectively advancing said waste liner rewind device when said head frame member is connected to said cassette frame member.

13. The labeler of claim 12 including a peel plate mounted to said cassette frame adjacent to said tamping bellows, said peel plate including a terminal end, wherein said label web can be drawn around said terminal end to separate said labels from said release liner, and a drive wheel mounted to said head frame member, said drive wheel capable of advancing said label web along a label path from said label wheel and around said terminal end of said peel plate, wherein said drive wheel is operatively connected to said drive motor and said label wheel when said head frame is connected to said cassette frame.

14. The labeler of claim 13 wherein one of said head frame and said cassette frame includes a slot, and the other includes a pin for interfitting within said slot to connect said head frame and said cassette frame, said head frame and said cassette frame being properly aligned such that said drive motor is operatively connected to said drive wheel when said pin is interfitted within said slot.

15. The labeler of claim 12 including a print mechanism mounted to said head frame such that said print mechanism is positioned adjacent said label path when said head frame is connected to said cassette frame, said print mechanism capable of printing a desired print material on said labels as they pass from said label wheel to said peel plate.

16. The labeler of claim 15 wherein said print mechanism includes a label scanner for scanning printed images positioned along said label path for verifying that the printed material printed by said print mechanism falls within a predetermined parameter.

17. The labeler of claim 12 including a turret rotatably mounted to said head frame member, said turret supporting a plurality of said tamping bellows, said turret operatively connected to said drive motor for selectively rotating said turret.

18. A labeler comprising:

a head frame member;

a cassette frame member selectively removable from said head frame member;

a tamping bellows connected to said head frame member, said tamping bellows including a tamping face that is moveable between a retracted position and an extended tamping position;

a label wheel mounted on said cassette frame member;

a label web including a release liner and a plurality of labels attached to said release liner, at least a portion of said label web wound around said label wheel;

a peel plate mounted to said one of said head frame member and said cassette frame member adjacent to said tamping bellows, said peel plate including an upper surface, a lower surface and a terminal end, said label web extending around said terminal end to separate said labels from said release liner;

a drive motor mounted on said head frame, said drive motor capable of advancing said label web from said label wheel and around said terminal end of said peel plate;

a waste liner rewind device mounted on said cassette frame;

a rewind mechanism mounted on said cassette frame, said rewind mechanism including a pivotable arm pivoting about a first pivot point and a trigger arm pivoting about a second pivot point spaced from said first pivot point, said pivotable arm including a portion about which said waste liner extends, said pivotable arm moving about said first pivot point as a result of a change in the tension of said waste liner extending about said portion of said pivotable arm, said trigger arm contacting said pivotable arm such that said trigger arm moves upon movement of said pivotable arm;

a sensor mounted on said head frame, said sensor capable of sensing movement of said trigger arm when said cassette frame member and said head frame member are connected; and a rewind drive mounted on said head frame, said rewind drive connected to said sensor, such that said rewind drive is actuated upon said sensor detecting movement of said trigger arm.

* * * * *